Sept. 12, 1961  H. H. SEWARD  2,999,967
SERVO SYSTEMS
Filed April 23, 1959  2 Sheets-Sheet 1

INVENTOR.
HAROLD H. SEWARD
BY
ATTORNEY

Sept. 12, 1961        H. H. SEWARD        2,999,967

SERVO SYSTEMS

Filed April 23, 1959                                2 Sheets-Sheet 2

$\theta_3 = N_1 \theta_1 \pm N_2 \theta_2$ $\theta_2 = \dfrac{N_1 \theta_1}{1 \pm N_2}$

→◇ D C LEVEL
—— POSITIVE PULSE

INVENTOR.
HAROLD H. SEWARD
BY
*Joseph Weingarten*
ATTORNEY

United States Patent Office 2,999,967
Patented Sept. 12, 1961

2,999,967
SERVO SYSTEMS
Harold H. Seward, 7 Leroy Drive, Burlington, Mass.
Filed Apr. 23, 1959, Ser. No. 808,378
6 Claims. (Cl. 318—171)

The present invention relates in general to servo systems and is more particularly concerned with servo systems utilizing a photoelectric shaft-position transducer. More specifically, the invention relates to servo systems incorporating optical synchros of the type described in my co-pending application Serial No. 731,844, filed April 29, 1958, entitled "Electromechanical Transducing System," of which the present application is a continuation-in-part.

The optical synchro of my above-referenced application generally comprises a circular disc having a photographic or etched pattern divided into a relatively large number of alternately opaque and light transmissive (transparent or translucent) equiangular sectors and mounted on a rotatable shaft. A similar circular disc with alternately opaque and transparent equiangular sectors, but having one more opaque and one more transparent sector, is supported parallel and closely adjacent to the other disc about the shaft axis. The centers of both discs are disposed on the axis of shaft rotation, and one of the discs is held in fixed position and the other mounted for rotation by an input shaft. Four photoelectric transducers, such as phototransistors, are circumferentially spaced about peripheral portions of one disc and are arranged to receive light from respective light sources transmitted through both discs.

At one point in the circumference of the disc, a minimum of light (substantially zero) will be transmitted to the phototransistors since the opaque sectors of one disc entirely cover the transparent sectors of the other. In the circumferential regions spaced 90° in either direction from the region of minimum light transmission, the transparent sectors are only half covered by opaque sectors. In the circumferential region diametrically opposite the region of minimum light transmission, the transmission of light is a maximum because there the transparent sectors of the disc having the larger number of equiangular sectors are directly opposite the transparent sectors of the other disc.

When the input shaft is rotated angularly by an amount equal to a sector angle, the diametrically opposite regions where light is minimally and maximally transmitted is reversed, that is, the opaque region and the transparent region each rotate 180°. For a single full rotation of a disc, the dark and light pattern is effectively "geared up" optically to rotate N times, N being the number of opaque lines on the rotating disc. As the pattern rotates, the light transmitted to the phototransistors is correspondingly modulated to produce a characteristic electrical output signal. When the phototransistors are energized in cascode from a D.C. supply, the output waveform is of triangular shape. One pair of diametrically opposite illuminated phototransistors produces a single waveform with positive and negative phases, and the other pair mounted in space quadrature, produce a second triangular waveform 90° out of phase with the first. Each cycle of the two quadrature triangular waveforms corresponds to a rotational angle of $360°\div N$. Stated another way, for each revolution of the input shaft, the output waveforms go through N cycles.

Briefly, according to the present invention, the resolution capability of the optical synchro is combined with the torquing capability of a resolver to provide a novel class of servo systems. A resolver being essentially a two-phase motor, if the quadrature triangular waveforms from the optical synchro are applied to the resolver stator windings, which are in space quadrature, a rotating magnetic field is produced, with one complete revolution of the field occurring for each opaque sector of the rotating disc of the optical synchro. The direction of rotation reverses when that of the optical synchro is reversed.

The system thus far described, that is, the quadrature stator windings of the resolver energized by quadrature triangular signals from the optical synchro may be adapted to several angle transmission systems by the choice of excitation of the rotor windings of the resolver, which are also in space quadrature. For example, if constant excitation is applied to one of the rotor windings, a rotor field sector is produced which interacts with the stator field to create a torque which will turn the rotor until the two fields oppose one another. Hence, for one rotation of the optical synchro, N rotations of the resolver will occur. The maximum correction torque occurs when the resolver shaft is 90° from null. The other rotor winding may be shorted through a variable resistance to afford a simple and effective damping control by induction motor action. This arrangement affords an angle transmission system from the input shaft of the optical synchro to the output shaft connected to the rotor of the resolver. A high gearing ratio is also attained in transmitting the shaft angle.

A differential angle transmission system is provided by energizing the stator windings of the resolver with the quadrature triangular signals from a first optical synchro, and energizing the rotor windings from the quadrature signals from a second optical synchro, with an output shaft mechanically coupled to the rotor of the resolver. Thus energized, the resolver will make one complete revolution each time the net rotations of the two optical synchros differ by one opaque and clear sector.

According to another embodiment of the invention, the stator windings of the resolver are energized from one optical synchro, the rotor windings of the resolver are energized from a second optical synchro, and the input shaft of the second optical synchro is coupled directly to the resolver shaft. In this arrangement, the rotor field will rotate once per opaque and clear sector in the same manner that the stator field rotates with the first optical synchro, and, as in the case of constant excitation, the rotor will be torqued until the two fields are in opposing direction. With an output shaft directly coupled to the resolver shaft, this arrangement provides a gearing ratio from input to output shaft of $N_1/N_2\pm1$, where $N_1$ is the number of sectors on the optical synchro used to energize the stator of the resolver and $N_2$ is the number of sectors on the rotor optical synchro. The maximum correcting torque is on the same magnitude as with constant excitation, but occurs when the rotor is displaced from null by only $90°\div N_2\pm1$. Hence, although the gear ratio has been reduced, the stiffness of the servo has been increased in the same proportion.

In still another embodiment, the optical synchro-resolver combination affords a simple and versatile digital-to-shaft converter. The shaft of the optical synchro is coupled directly to the resolver rotor, and the stator winding of the resolver is excited by a flip-flop circuit which provides a constant current excitation of either polarity. Each one of the four possible combinations of two flip-flops will position the stator field at a particular 90° position.

Other features and advantages, and a better understanding of the construction and operation of the invention will become apparent from the following specification when read in connection with the accompanying drawing in which.

Figure 1:
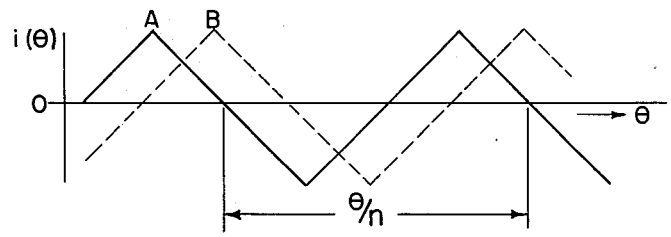
FIG. 1 shows the time relationship between the signals, as a function of shaft angle, derived from the two pairs of space quadrature, cascode-connected phototransistors of a two-phase optical synchro of the type described in my aforementioned copending application.

With reference now to FIG. 1, there is shown a graphical representation as a function of shaft angle $\theta$ of a waveform A provided at one of the output terminals of an optical synchro of the type described in my aforementioned application and a waveform B, displaced from waveform A by 90 electrical degrees provided at the other output terminal of a two-phase optical synchro. The two output terminals have a common grounded terminal with the result that both signals have positive and negative phases as shown. In terms of rotation of the input shaft of the opical synchro, each cycle of the triangular waveforms A and B is equal to $$\frac{\theta}{N}$$

where $\theta$ is the shaft rotation angle, and N is the number of transparent sectors. The triangular waveform output signal is similar to that of an ordinary synchro except that N cycles occur per revolution of the input shaft rather than only one. In other words, for a rotating disc of N lines, N cycles occur per revolution of the input shaft of the optical synchro. This important characteristic of the output signals from the two-phase optical synchro makes possible the servo systems of the present invention, which basically combine the resolution capability of the optical synchro with the torquing capability of a resolver.

Figure 2:
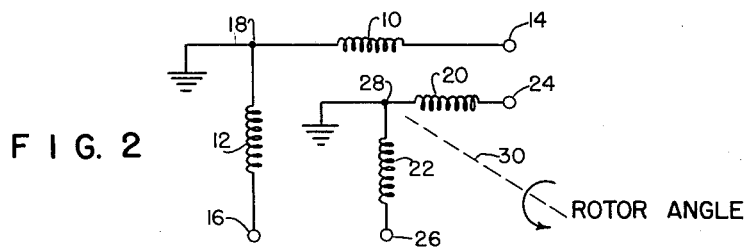
FIG. 2 is a schematic diagrm of a two-phase wound rotor motor.

As is well known in the art, a resolver is essentially a motor wound with a two-phase stator and a two-phase rotor as shown in FIG. 2. The stator windings 10 and 12 having input terminals 14 and 16, respectively, and a common grounded terminal 18 are wound in space quadrature. Similarly, the rotor of the resolver has two space quadrature windings 20 and 22 having input terminals 24 and 26, respectively, and a common grounded terminal 28. If the two stator windings are energized by quadrature phase signals, a rotating field is produced which makes one revolution for each cycle of the energizing signal. If one or both of the windings of the rotor is energized by a D.C. signal, a rotor field vector is produced which interacts with the stator field to create a torque to turn the motor until the two vectors oppose one another. Hence, for each cycle of the energizing signals applied to the stator, the rotor shaft, indicated by dotted line 30, turns through one revolution.

Figure 3:
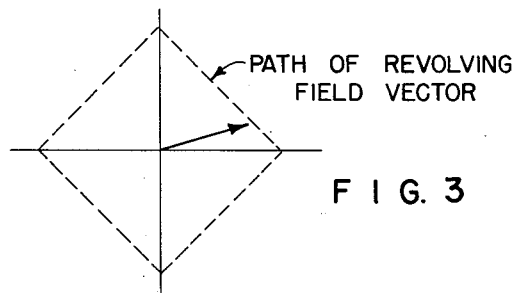
FIG. 3 shows the locus of the rotating field sector in a two-phase stator energized by phase quadrature triangular waveform signals.

If the waveforms A and B of FIG. 1 are respectively applied to windings 10 and 12 of the resolver stator, the resulting magnetic field will rotate as shown in FIG. 3. A complete rotation of the field will occur for each opaque sector on the rotating disc of the optical synchro. The direction of rotation will also follow that of the optical synchro. It will be noted that the locus of the rotating field vector, when the exciting waveform is triangular, follows a square pattern.

Figure 4:
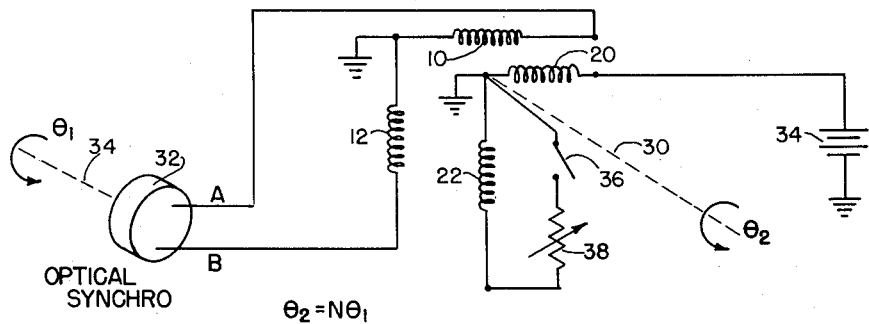
FIG. 4 is a schematic diagram of an angle transmission system with a high gearing ratio.

Referring now to FIG. 4, there is shown an angle transmission system having a high gearing ratio by reason of the characteristics of the optical synchro. The quadrature phase waveforms A and B from an optical synchro 32 are applied to windings 10 and 12 of the resolver stator, to produce a rotating field of the type shown in FIG. 3. Constant D.C. excitation, from battery 34, is applied to winding 20 of the resolver rotor to thereby also produce a rotor field vector. This rotor field interacts with the stator field and creates a torque that will turn the rotor until the two vectors oppose one another. Hence, for one rotation of the optical synchro 32 (that is, $\theta_1 = 360°$), N rotations (N times 360°) occur. Thus, with an optical synchro having 15 opaque sectors, for each degree of rotation of the input shaft of optical synchro 32 the shaft 30 of the resolver rotates 15°. In short, $\theta_2 = N\theta_1$, representing a "high gearing up" between the input shaft 34 of the optical synchro and the output shaft 30. The maximum correction torque occurs when the resolver shaft 30 is 90° from null. A simple and effective damping control of the resolver is afforded by shorting winding 22 of the rotor through a switch 36 and a variable resistance 38 to achieve induction motor action.

Figure 5:
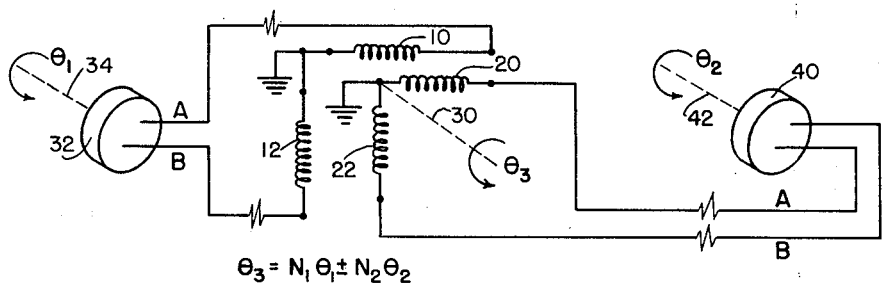
FIG. 5 is a schematic diagram of a differential angle transmission system with high gearing ratio.

By also energizing the rotor of the resolver with quadrature phase triangular waveform signals from an optical synchro, a differential angle transmission system with high gearing ratio may be obtained. As shown in FIG. 5, the stator windings of a resolver are energized by quadrature phase signals A and B from a first optical synchro 32, which may be located remotely from the resolver, as indicated by the broken line connections, and the rotor windings are similarly energized by quadrature phase signals A and B from a second optical synchro 40, which may also be remotely located. It will be appreciated that this excitation of the rotor winding will produce a rotating magnetic field in the rotor having a locus similar to that shown in FIG. 3. Due to the interaction of the two rotating fields, which may be in the same or opposite directions depending upon the connections of the optical synchros 32 and 40 to the stator windings and rotor windings, respectively, the resolver will make one complete revolution each time the net rotations of the two optical synchros differ by one opaque and one clear sector. Stated another way, the rotation $\theta_3$ of the resolver shaft 30 is equal to $N\theta_1 \pm N_2\theta_2$, where $N_1$ is the number of opaque sectors on the rotating disc of optical synchro 32 and $N_2$ is the number of opaque sectors on the rotating disc of optical synchro 40, and $\theta_1$ and $\theta_2$ are the shaft angles of shafts 34 and 42, respectively.

Figure 6:
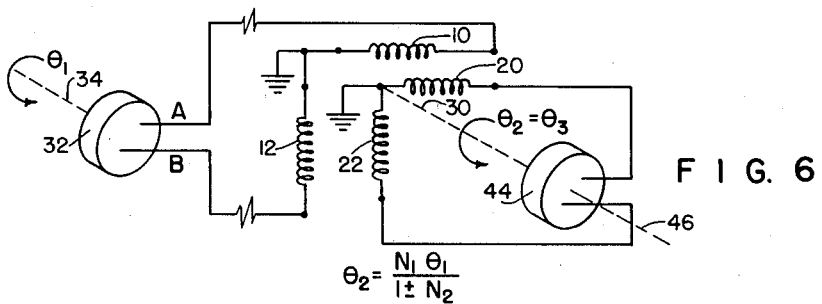
FIG. 6 is a schematic diagram of still another angle transmission system with a low gearing ratio.

Referring to FIG. 6, there is illustrated an angle transmission system in which the high gearing capability afforded by the optical synchro is traded for synchro stiffness. Here again, the stator windings of the resolver are energized by the quadrature phase signals A and B from optical synchro 32, which may be at a remote location, and the rotor windings of the resolver are energized from a second optical synchro 44, the input shaft of which is coupled directly to the rotor shaft 30 of the resolver. As in the system of FIG. 5, the rotor magnetic field rotates once per opaque sector on its rotating disc in the same manner that the stator field rotates with the optical synchro 32. The rotor will be torqued until the two fields are in opposing direction. It will be seen that the gear ratio from input shaft 34 to output shaft 46 (which may be an extension of shaft 30) is $N_1/N_2 \pm 1$, where $N_1$ is the number of sectors on the rotating disc of optical synchro 32 and $N_2$ is the number of sectors on the rotating disc of optical synchro 44. The $\pm 1$ sector depends upon whether the rotor field is connected to rotate in the same (plus) or opposite (minus) direction as the rotor motion. The maximum correcting torque is of the same magnitude as with constant rotor field excitation, but occurs when the rotor is displaced from null by only 90° over $N_2 \pm 1$. Hence, although the gear ratio has been reduced by $N_2 \pm 1$, the stiffness of the servo has been increased in the same proportion. In terms of shaft rotation, the rotation of the output shaft 46, $\theta_2$, equals $N_1\theta_1/(1 \pm N_2)$.

Figure 7:
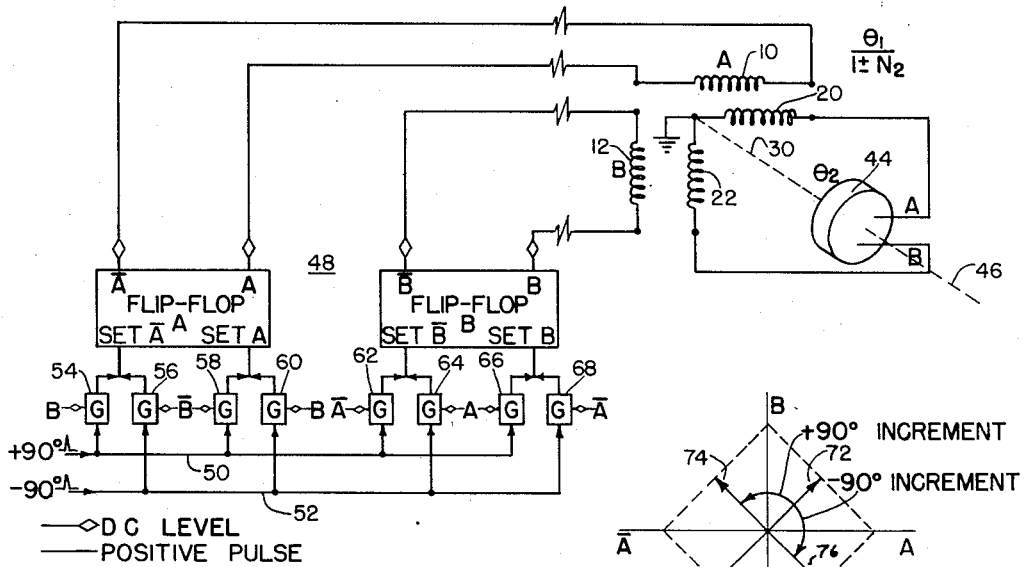
FIG. 7 is a schematic diagram, partially in block diagram form, of the digital-to-shaft converter embodying the invention.

FIG. 7 shows a system similar in some respects to that of FIG. 6 except that the two stator windings 10 and 12 are separately excited by power flip-flops which provide a constant current excitation of either polarity. The rotor windings 20 and 22 are excited by quadrature phase waveforms A and B from optical synchro 44, the input shaft of which is directly coupled to the rotor shaft 30. An extension 46 of rotor shaft 30 is incrementally positioned in response to the excitation of the stator windings by digital information.

In the left-hand portion of FIG. 7, there is shown a logical block diagram of a flip-flop circuit 48 with associated gates for receiving digital information and applying excitation in response thereto to the windings of the stator of the resolver. The digital information is applied in the form of pulses to two input lines 50 and 52 with the pulses applied to line 50 representing a positive increment in the rotation of the stator field, and pulses applied to line 52 representing negative increments of the stator field. For proper operation, it is essential that pulses applied to line 50 are not coincident with pulses applied to line 52, but apart from this constraint, the sequence of pulses applied to one line is quite independent of the sequence applied to the other. Flip-flop A and flip-flop B are each adapted to assume two conductive states; that is, the output terminal designated $\overline{A}$ may be "up" while terminal A is "down," or vice versa, and similarly with flip-flop B, the conditions of each being dependent upon the last applied pulse on either of lines 50 and 52 and the settings of gates 54, 56, 58, 60, 62, 64, 68 and 70. D.C. conditioning potentials, designated A and B, are respectively provided by flip-flop A and flip-flop B when the associated terminals thereof are then "up." Conditioning potentials $\overline{A}$ and $\overline{B}$ are respectively provided by flip-flops A and B from the complementary outputs (i.e., terminals $\overline{A}$ and $\overline{B}$) when these terminals are "up." The presence of a conditioning potential allows a gate to pass any input pulse. With the connection shown, when a positive pulse is applied to line 50, one or the other of gates 54 and 58 is open depending upon the condition of flip-flop B. Should gate 54 be open and flip-flop A in a condition to be set by application of a pulse to SET $\overline{A}$, the condition of flip-flop A will be altered causing the current to reverse through stator winding 10 and thereby cause the field of the stator to rotate forward by 90°, the "forward" designation being arbitrary. If, on the other hand, gate 54 is open but flip-flop A is in a condition so as not to be flipped by the application of a pulse to set $\overline{A}$, the conditioning potentials are such that gate 62 will be open to change the conductivity state of flip-flop B in a direction to energize winding 12 in such a direction as to cause "forward" rotation of the field by 90°. Similarly, depending upon the conductivity states of flip-flops A and B at the instant of application of a positive pulse to line 52, one or the other of the flip-flops will be switched to cause current flow in the opposite direction in winding 10 or 12 to rotate the field "backward" by 90°. It will be apparent that with this circuit arrangement there are four possible combinations of excitation of the windings 10 and 12; namely, A and B, −A and B, −A and −B, and A and −B. As graphically depicted in FIG. 7A, each one of these four possible combinations will position the stator field at a particular 90° position.

Figure 7A:
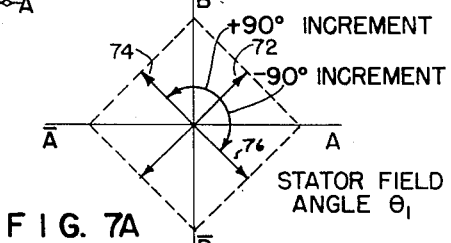
FIG. 7A illustrates the incremental rotation of the field of the stator of the system of FIG. 7 for various combinations of excitation of the stator windings.

The vector 72 in FIG. 7A, for example, represents a condition of excitation where A and B are both "up"; vector 74, which represents a +90° increment in the position of the stator field from that of vector 72, is produced by $\overline{A}$ and B; and vector 76 represents a −90° increment from vector 72 and is produced by A and $\overline{B}$. Reviewing what has been said earlier, a pulse applied to line 50 represents a positive increment in position of the rotating field, and a pulse applied to line 52 represents a negative increment which rotates the field backward 90°. Such pulsing causes maximum torque to be applied to the rotor of the resolver, which it will be remembered is energized by the quadrature phase triangular waveform signals from optical synchro 44, to turn the optical synchro, via shaft 30, until the rotor field moves 90° to null. Since the shaft 30 of the optical synchro need turn only 90° over $N \pm 1$ to reach null, extremely accurate positioning can be accomplished; that is, the incremental rotation of shaft 30 for each pulse applied to either of lines 50 or 52 can be made very small by using an optical synchro with a large number of lines. In comparing this device to a conventional stepping motor, it is obvious that much smaller angular steps may be taken, thereby allowing higher frequency stepping rates with considerably more accuracy and power.

From the foregoing it is seen that the resolution capability of the optical synchro together with the torquing capability of a resolver makes possible a new class of servo systems suitable in a number of applications. The servo may be used for the transmission of shaft rotation angle, with either high or low gearing ratio, or differentially with high gearing ratio, or a shaft may be positioned in response to digital information.

The functions of the rotor ant stator fields are generally interchangeable. The principles are also applicable to linear measurement ant control. The signals may be polyphase. Moreover, the electrical signal may be D.C. as illustrated or modulated (e.g., 400 cycles).

Numerous other uses and modifications of and departures from the specific embodiments described herein will now be apparent to those skilled in the art without departing from the inventive concepts. Consequently, the invention is to be construed as limited only by the spirit and scope of the appended claims.

What is claimed is:

1. Apparatus for electrically driving a shaft comprising, in combination: a resolver including a stator and a rotor, each having a pair of space quadrature windings, and a shaft connected to said rotor; an optical synchro including a rotatable input shaft and operative in response to the position of said input shaft to provide first and second triangular waveform output signals in electrical phase quadrature, said signals having N cycles for each revolution of said input shaft where N is an integer greater than 1; connections from said optical synchro to said resolver for applying said first and second signals to one of said pairs of space quadrature windings to produce a magnetic field rotating N times for each revolution of said input shaft; and a source of excitation current connected to the other of said pairs of space quadrature windings.

2. Apparatus in accordance with claim 1 wherein said first and second signals are applied to the stator windings of said resolver and said source of excitation current is a source of direct potential, whereby the rotor of said resolver makes N revolutions for each revolution of the input shaft of said optical synchro.

3. Apparatus in accordance with claim 1 wherein said first and second signals are applied to the stator windings of said resolver, and said source of excitation current comprises a second optical synchro including an input shaft and operative in response to the position of its input shaft to provide third and fourth triangular waveform signals in electrical phase quadrature each having N cycles for each revolution of its input shaft, and means for applying said third and fourth signals to the rotor windings of said resolver.

4. Apparatus in accordance with claim 3 wherein the input shaft of said second optical synchro is directly connected to the rotor shaft of said resolver.

5. Apparatus in accordance with claim 1 wherein said first and second signals are applied to the rotor windings of said resolver and said source of excitation current comprises: two pulse sources each adapted to generate pulses of positive and negative polarity, and connections from said pulse sources to respective ones of the resolver stator windings; and wherein the input shaft of said optical synchro is directly connected to the rotor shaft of said resolver.

6. Apparatus in accordance with claim 1 wherein said first and second signals are applied to the rotor windings of said resolver and said source of excitation current comprises: first and second flip-flop circuits, a plurality of control gates connected to said flip-flops for controlling the operation thereof, means for applying first and second trains of pulses to said control gates whereby said flip-flop circuits are each operative to generate pulses of positive and negative polarity, and connections from said first and second flip-flop circuits to respective ones of the resolver stator windings; and wherein the input shaft of said optical synchro is directly coupled to the rotor shaft of said resolver.

No references cited.